(12) United States Patent
Knittel et al.

(10) Patent No.: US 9,557,202 B2
(45) Date of Patent: Jan. 31, 2017

(54) AIR MASS METER WITH A SENSOR ELEMENT

(71) Applicant: CONTINENTAL AUTOMOTIVE GMBH, Hannover (DE)

(72) Inventors: Thorsten Knittel, Pentling (DE); Stephen Setescak, Pentling (DE)

(73) Assignee: Continental Automotive GmbH, Hannover (DE)

( * ) Notice: Subject to any disclaimer, the term of this patent is extended or adjusted under 35 U.S.C. 154(b) by 92 days.

(21) Appl. No.: 14/437,732

(22) PCT Filed: Oct. 21, 2013

(86) PCT No.: PCT/EP2013/071917
§ 371 (c)(1),
(2) Date: Apr. 22, 2015

(87) PCT Pub. No.: WO2014/064026
PCT Pub. Date: May 1, 2014

(65) Prior Publication Data
US 2015/0285666 A1    Oct. 8, 2015

(30) Foreign Application Priority Data

Oct. 23, 2012  (DE) .................... 10 2012 219 305

(51) Int. Cl.
*G01F 1/692* (2006.01)
*G01F 1/684* (2006.01)
(Continued)

(52) U.S. Cl.
CPC ............... *G01F 1/692* (2013.01); *G01F 1/684* (2013.01); *G01F 1/6845* (2013.01); *G01F 1/696* (2013.01); *G01F 5/00* (2013.01); *G01F 15/02* (2013.01)

(58) Field of Classification Search
CPC ........ G01F 15/02; G01F 1/684; G01F 1/6845; G01F 1/692; G01F 1/696; G01F 5/00
See application file for complete search history.

(56) References Cited

U.S. PATENT DOCUMENTS

| 5,765,432 A | 6/1998 | Lock et al. |
| 6,865,938 B2 | 3/2005 | Pesahl et al. |

(Continued)

FOREIGN PATENT DOCUMENTS

| DE | 4208135 A1 | 9/1993 |
| DE | 4407209 A1 | 9/1995 |

(Continued)

*Primary Examiner* — Francis Gray
(74) *Attorney, Agent, or Firm* — Cozen O'Connor

(57) ABSTRACT

An air mass meter has a sensor element, across which an air mass flow to be measured moves. The sensor element is a micro-electro-mechanical system having a membrane, on which a heating element is formed. An electrical measuring resistor and at least two electrical comparison resistors are arranged upstream and downstream of the heating element. A first temperature sensor element is formed with a measuring resistor upstream of the heating element and two comparison resistors arranged downstream of the heating element. The second temperature sensor element is formed with a measuring resistor arranged downstream of the heating element and two comparison resistors arranged upstream of the heating element.

5 Claims, 5 Drawing Sheets

(51) Int. Cl.
*G01F 1/696* (2006.01)
*G01F 5/00* (2006.01)
*G01F 15/02* (2006.01)

(56) References Cited

U.S. PATENT DOCUMENTS

| | | | |
|---|---|---|---|
| 6,871,534 B1 * | 3/2005 | Hamada | F02D 41/185 |
| | | | 73/202.5 |
| 7,650,784 B2 * | 1/2010 | Watanabe | G01F 1/6842 |
| | | | 73/204.26 |
| 2003/0010110 A1 | 1/2003 | DuBois et al. | |
| 2006/0037390 A1 * | 2/2006 | Nakano | G01F 25/0007 |
| | | | 73/204.21 |
| 2006/0065049 A1 * | 3/2006 | Nakada | G01F 1/6842 |
| | | | 73/204.26 |
| 2008/0245145 A1 * | 10/2008 | Mayer | G01F 1/6845 |
| | | | 73/204.26 |
| 2008/0282791 A1 | 11/2008 | Nakano et al. | |
| 2011/0107832 A1 * | 5/2011 | Sakuma | G01F 1/6842 |
| | | | 73/204.26 |

FOREIGN PATENT DOCUMENTS

| | | |
|---|---|---|
| DE | 10 2010 002023 A1 | 8/2010 |
| EP | 1816446 A2 | 8/2007 |
| EP | 2320200 A1 | 5/2011 |
| JP | 2000-227352 | 8/2000 |
| JP | 2000-352531 | 12/2000 |
| JP | 2006-064710 | 3/2006 |
| JP | 2006-098057 | 4/2006 |
| WO | WO 03/089884 A1 | 10/2003 |

\* cited by examiner

AIR MASS METER WITH A SENSOR ELEMENT

CROSS-REFERENCE TO RELATED APPLICATIONS

This is a U.S. national stage of application No. PCT/EP2013/071917, filed on 21 Oct. 2013, which claims priority to the German Application No. DE 10 2012 219 305.7 filed 23 Oct. 2012, the content of both incorporated herein by reference.

BACKGROUND OF THE INVENTION

1. Field of the Invention

The invention relates to an air mass meter with a sensor element, wherein an air mass flow to be measured moves over the sensor element, and wherein the sensor element is embodied as a microelectromechanical system which has a diaphragm on which a heating element is embodied, wherein in each case one electrical measuring resistor and at least two electrical comparison resistors are arranged upstream and downstream of the heating element in the direction of the air mass flow, and wherein a first temperature sensor element and a second temperature sensor element are formed by the electrical connection of in each case one measuring resistor to at least two comparison resistors.

2. Related Art

Such air mass meters are used, for example, in motor vehicles for determining the air mass swept in by an internal combustion engine. Combustion can be optimized on the basis of the most reliable possible information about a sucked-in air mass by an electronic control of the internal combustion engine, to the effect that a quantity of fuel which is matched precisely to the air mass is fed to the respective combustion chamber. As a result, better utilization of energy with reduced emission of pollutants is achieved.

DE 44 07 209 A1 discloses an air mass meter plugged into an intake duct for determining an air mass, wherein a defined proportion of the total flow flows through the air mass sensor. For this purpose, the latter is embodied as a plug-in duct air mass meter. The air mass meter comprises a sensor element arranged in a measuring duct, electronics arranged in a housing for evaluating and/or for detecting the measured values of the sensor element, and an outlet duct on the other side of the sensor element. For a space-saving arrangement, the specified ducts or air-guiding paths are embodied in the form of a U, S or C, with the result that a device that is compact overall and is embodied as a plug-in element is formed.

US 2008/0282791 A1 discloses an air mass meter with a sensor element in which in each case temperature sensor elements are arranged upstream and downstream of a heating element embodied on a diaphragm. The temperature sensor elements are arranged in such a way that shifting of a characteristic curve owing to deposits of dirt is suppressed.

US 2003/0010110 A1 discloses a mass flow sensor that operates bidirectionally and has a bridge circuit connected to a voltage potential, wherein the bridge circuit contains a first and a second temperature-dependent sensor, which sensors are connected in series and are arranged on a thermally insulating substrate.

DE 42 08 135 A1 discloses a device for measuring a flow of gas or fluid. Here, two temperature-sensitive resistor devices form a first sensor, and two further temperature-sensitive resistor devices form a second sensor. The two sensors are arranged in such a way that they do not influence one another thermally.

An air mass meter embodied according to the teaching of WO 03/089884 A1 and embodied as a hot-film anemometer has in principle proven valuable.

During the development of modern air mass meters that operate on the basis of sensor elements embodied as microelectromechanical systems (MEMS) it has become apparent that the measurement results of the sensor elements are influenced in a particularly disadvantageous way by contamination. Contamination, which can be caused, for example, by oil droplets in the air mass flow, results over time in the occurrence of signal drift in the sensor element, which sensor drift can lead to incorrect measured values for the air mass flow. However, sensor elements embodied as microelectromechanical systems have a multiplicity of advantages which should not be dispensed with.

SUMMARY OF THE INVENTION

Therefore an object of the invention is to eliminate the falsification of the measurement results by the contamination of the sensor element or at least to keep it within tight limits.

According to an aspect of the invention, the first temperature sensor element is formed as a series circuit composed of resistors on the sensor element with a measuring resistor arranged upstream of the heating element with respect to the air mass flow, and two comparison resistors arranged downstream of the heating element with respect to the air mass flow, and the second temperature sensor element is formed as a series circuit composed of resistors on the sensor element with a measuring resistor arranged downstream of the heating element with respect to the air mass flow, and two comparison resistors arranged upstream of the heating element with respect to the air mass flow. As a result of this connection of the resistors arranged on the sensor element, the signal distortion is compensated by particles of dirt, such as for example oil droplets, which are deposited on one side, and the signal from the air mass meter is not falsified by the contamination of the sensor element. Therefore, the measurement results of the air mass meter remain stable over a long time, and cyclical recalibration of the air mass meter can be dispensed with. It is advantageous if the sensor element is embodied with the thin diaphragm as a microelectromechanical system (MEMS). Such sensor elements supply excellent measurement results since the thin diaphragm is a poor thermal conductor and therefore only the thermal conductivity of the air mass flowing past determines the measurement results.

In one refinement the resistance values of the individual measuring resistors are significantly larger than the resistance values of the individual comparison resistors. In particular it is advantageous if the resistance values of the individual measuring resistors are greater than the resistance values of the individual comparison resistors at least by a factor of 10. Such a selection of the resistance values gives rise to very good measurement results for the air mass flow which can be reproduced to an excellent degree.

In one development of the invention, the comparison resistors are arranged in the edge region of the diaphragm. As a result, the particularly pronounced depositing of dirt in the edge region of the diaphragm hardly affects the measurement results of the air mass meter.

In a subsequent development of the invention, the measuring resistors are arranged in the inner region of the diaphragm. Therefore, the measuring resistors are not affected by the contamination of the measuring element that occurs in particular in the edge region of the diaphragm, which also contributes to the stability of the measurements results.

BRIEF DESCRIPTION OF THE DRAWINGS

Further features and advantages of the invention are specified below with a description of an exemplary embodiment with reference to the figures in the drawing. The same terms and reference numerals are used for identical components throughout the various figures. In the drawings.

DETAILED DESCRIPTION OF THE PRESENTLY PREFERRED EMBODIMENTS

Figure 1:
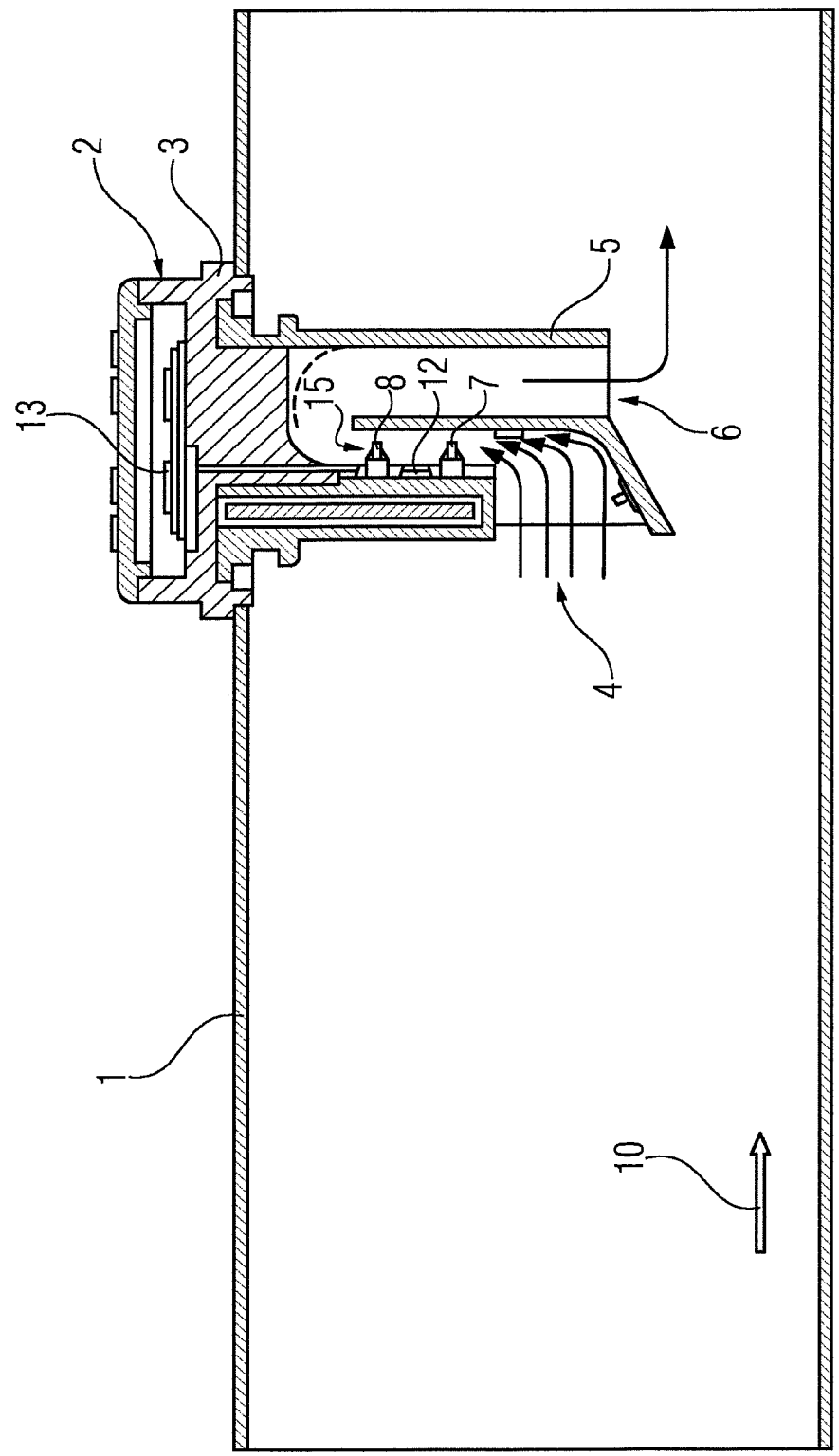
FIG. 1 shows an air mass meter.

FIG. 1 shows an air mass meter 2. The air mass meter 2 is embodied in this example as a plug-in finger that is plugged into an intake pipe 1 and is permanently connected to the intake pipe. The intake pipe 1 conducts an air mass flow 10 here, to the cylinders of an internal combustion engine. In order to burn the fuel in the cylinders of an internal combustion engine efficiently, it is necessary to obtain precise information about the available air mass. On the basis of the available air mass it is possible to infer the available oxygen necessary to burn the fuel injected into the cylinders. Furthermore, the air mass meter 2 in FIG. 1 shows a first temperature sensor element 7 and a second temperature sensor element 8. The first temperature sensor element 7 and the second temperature sensor element 8 are arranged at different locations. The temperature sensor elements 7, 8 are generally formed from resistors which adopt different resistance values in accordance with the temperature prevailing at the temperature sensor element. A heating element 12 is formed between the first temperature sensor element 7 and the second temperature sensor element 8. The air mass flow 10 which enters the housing 3 of the air mass meter 2 through the inlet opening 4 firstly flows over the first temperature sensor element 7 and then the heating element 12, after which the air mass flow 10 reaches the second temperature sensor element 8 and is directed along the auxiliary pipe 5 to the outlet opening 6 of the air mass meter 2. The air mass flow 10 reaches the first temperature sensor element 7 at a specific temperature. This temperature is detected by the first temperature sensor element 7. The air mass flow 10 then passes over the heating element 12, wherein the air mass flow 10 is heated up to a greater or lesser extent depending on the mass flowing past. When the heated air mass flow 10 reaches the second temperature sensor element 8, the temperature of the air mass flow 10 then present is determined with the second temperature sensor element 8. The air mass that has flown past can be determined from the difference between the temperatures measured by the first temperature sensor element 7 and the second temperature sensor element 8. For this purpose, the air mass meter 2 itself can include evaluation electronics 13, which evaluate the measurement signals of the first temperature sensor element 7 and of the second temperature sensor element 8. Information acquired in this way about the air mass flow 10 is passed on to an engine controller (not illustrated here).

Figure 2:
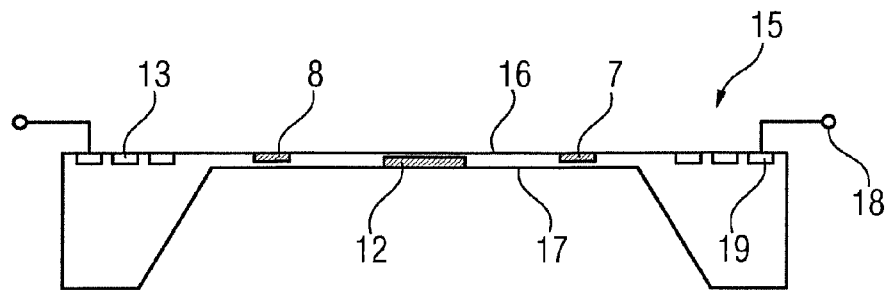
FIG. 2 shows a sensor element embodied as a microelectromechanical system (MEMS)

FIG. 2 shows a sensor element 15 for an air mass meter 1. The sensor element 15 is embodied as a microelectromechanical system (MEMS) on a single silicon chip. The sensor element 15 operates according to the differential temperature method, with which the mass of the quantity 10 of air flowing past is determined. For this purpose, a first temperature sensor element 7 and a second temperature sensor element 8 are embodied on a thin diaphragm 17. The first and the second temperature sensor element 7, 8 are situated at different locations on the surface 16 of the diaphragm 17. A heating element 12 is arranged between the first temperature sensor element 7 and the second temperature sensor element 8. In addition, evaluation electronics 13, which can immediately evaluate the measurement signals of the temperature sensor elements 7, 8 and convert them into a signal proportional to the air mass flow 10, are integrated into the sensor element 15, which is constructed as a microelectromechanical system. The evaluation electronics 13 can, however, also be integrated into a downstream electronic device. The information about the air mass flow 10 is then passed on via connecting pads 19 and connecting wires 18 to a downstream electronic engine controller (not illustrated here).

Figure 3:
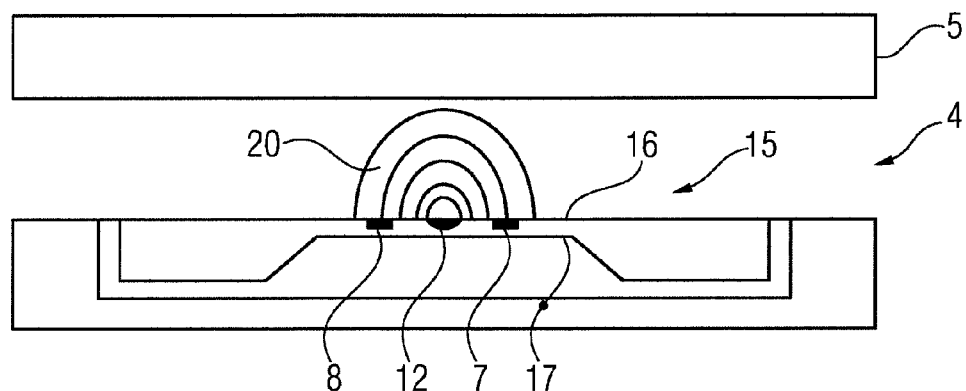
FIG. 3 shows a sensor element which is embodied as a microelectromechanical system (MEMS) and is arranged in an auxiliary pipe of the air mass meter.

FIG. 3 shows a sensor element 15, embodied as a microelectromechanical system (MEMS) for an air mass meter 2 embodied on a single substrate, wherein the substrate is arranged in an auxiliary pipe 5 of the air mass meter 2. In FIG. 3, no air mass flow 10 flows through the inlet opening 4, which will be the case, for example, when the internal combustion engine is switched off. When the heating element 12 on the sensor element is supplied with electrical energy, the symmetrical temperature distribution 20 illustrated here occurs around the heating element 12. Therefore, the first temperature sensor element 7 and the second temperature sensor element 8 measure the same temperature, and after the formation of differences between the temperature measurement signals of the temperature sensor elements 7, 8, the evaluation electronics 13 detect no air mass flow 10 is present in the auxiliary pipe 5 of the air mass meter 2.

Figure 4:
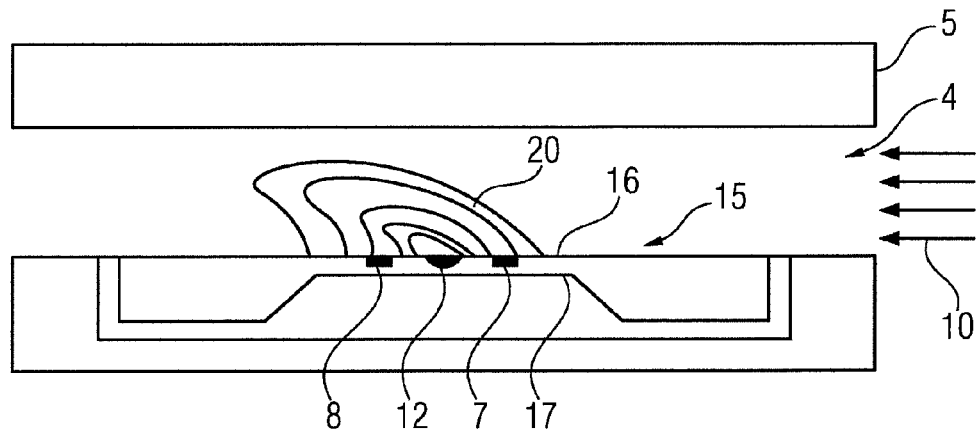
FIG. 4 shows a situation in which the air mass flow flows through the inlet opening into the auxiliary pipe of the air mass meter.

FIG. 4 shows a situation in which an air mass flow 10 flows into the auxiliary pipe 5 of the air mass meter 2 through the inlet opening 4. The temperature distribution 20 around the heating element 12 is now clearly visibly shifted in the direction of the second temperature sensor element 8. The second temperature sensor element 8 therefore measures a significantly higher temperature than the first temperature sensor element 7. The air mass flow 10 can now be determined by the detection of the differential temperature between the two temperature sensor elements 7, 8 in the evaluation electronics 13. The sum of the temperatures likewise reacts on the mass flow 10. However, the sum of the temperatures also reacts on the thermal properties of the air mass, such as for example the thermal capacity and/or the thermal conductivity of the air mass flow 10 flowing past. If, for example, the thermal conductivity of the air mass increases with the same air mass flow 10, the system cools down and the sum of the temperatures becomes significantly lower. The differential temperature between the first temperature sensor element 7 and the second temperature sensor element 8 remains, however, unchanged in a first approximation. Therefore, by the sum signal of the first temperature sensor element 7 and of the second temperature sensor element 8 it is possible to measure a change in the thermal properties such as, for example, the thermal capacity or the thermal conductivity of the air mass. If the differential temperature signal is then set off against the sum temperature signal, the changed thermal conductivity and/or the changed thermal capacity of the air mass flowing past can be inferred.

Figure 5:
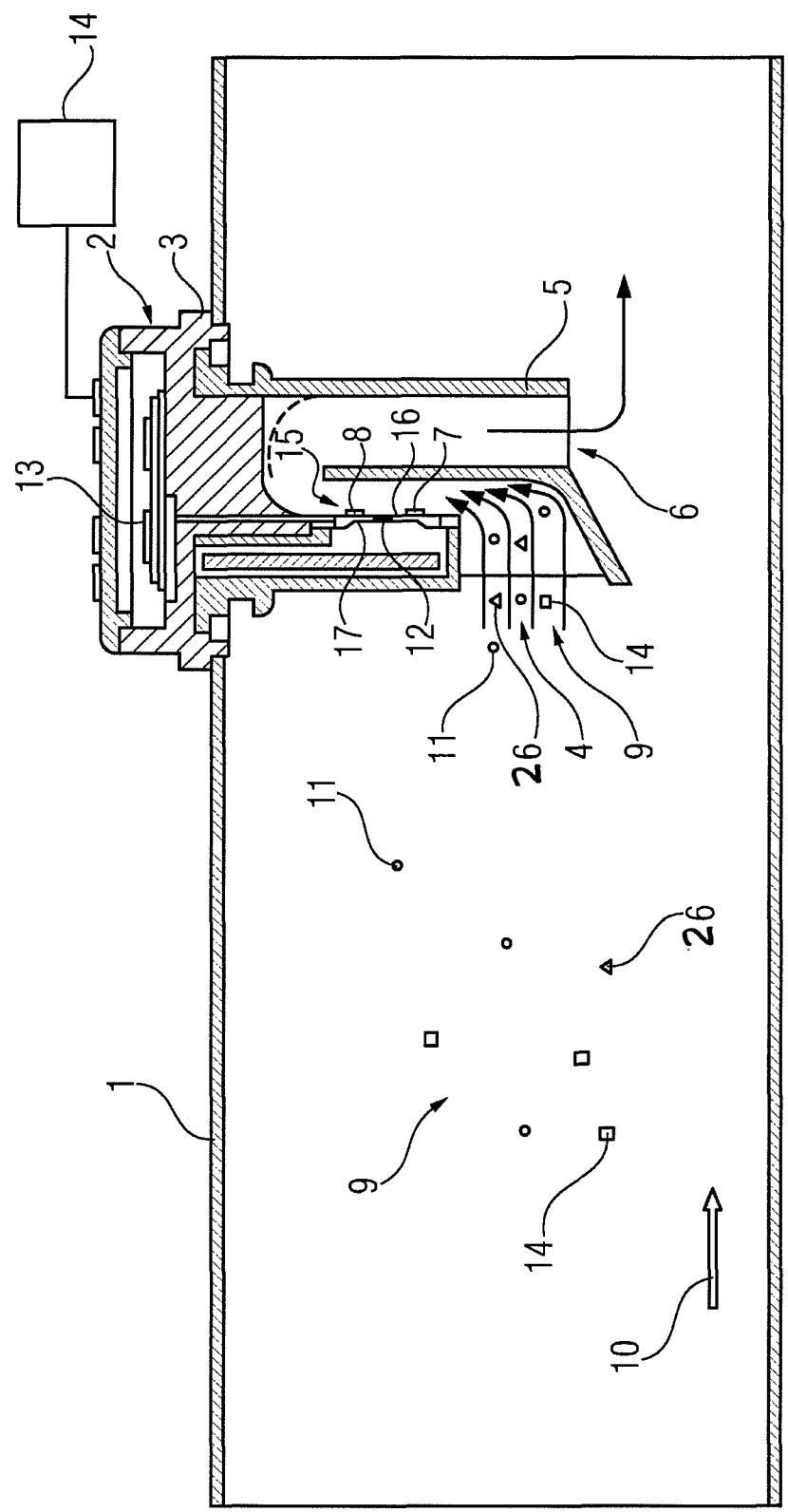
FIG. 5 shows the sensor element which is embodied as a microelectromechanical system (MEMS) in an air mass meter which is integrated as a plug-in finger into an intake pipe.

FIG. 5 shows the air mass sensor element 15 that is embodied as a microelectromechanical system (MEMS) in an air mass meter 2, which is integrated as a plug-in finger in an intake pipe 1. The air mass flow 10 also reaches the inlet opening 4 here and enters the auxiliary pipe 5. On the surface 16 of the diaphragm 17, the first temperature sensor element 7 and the second temperature sensor element 8 can be seen. The heating element 12 is arranged between the first temperature sensor element 7 and the second temperature sensor element 8. The air mass flow 10 firstly reaches the first temperature sensor element 7, then flows over the heating element 12 in order then to reach the second temperature sensor element 8.

FIG. 5 shows that the air mass flow 10 also includes contamination 9. For example water droplets 26, oil droplets 11 and/or particles of dust 14 are transported by the air mass flow 10 to the air mass meter 2. This contamination 9 passes through the inlet opening 4 of the air mass meter 2 to the sensor element 15. If the contamination 9 is deposited in the region of the first temperature sensor element 7 and the second temperature sensor element 8, a massive falsification of the measured value for the air mass flow 10 can occur over time. Since this falsification builds up increasingly as a result of the accumulation of the contamination on the sensor element 15 over a long time period, in this context the term signal drift of the air mass meter 2 is also used. This signal drift is undesired and should be suppressed and/or compensated.

Figure 6:
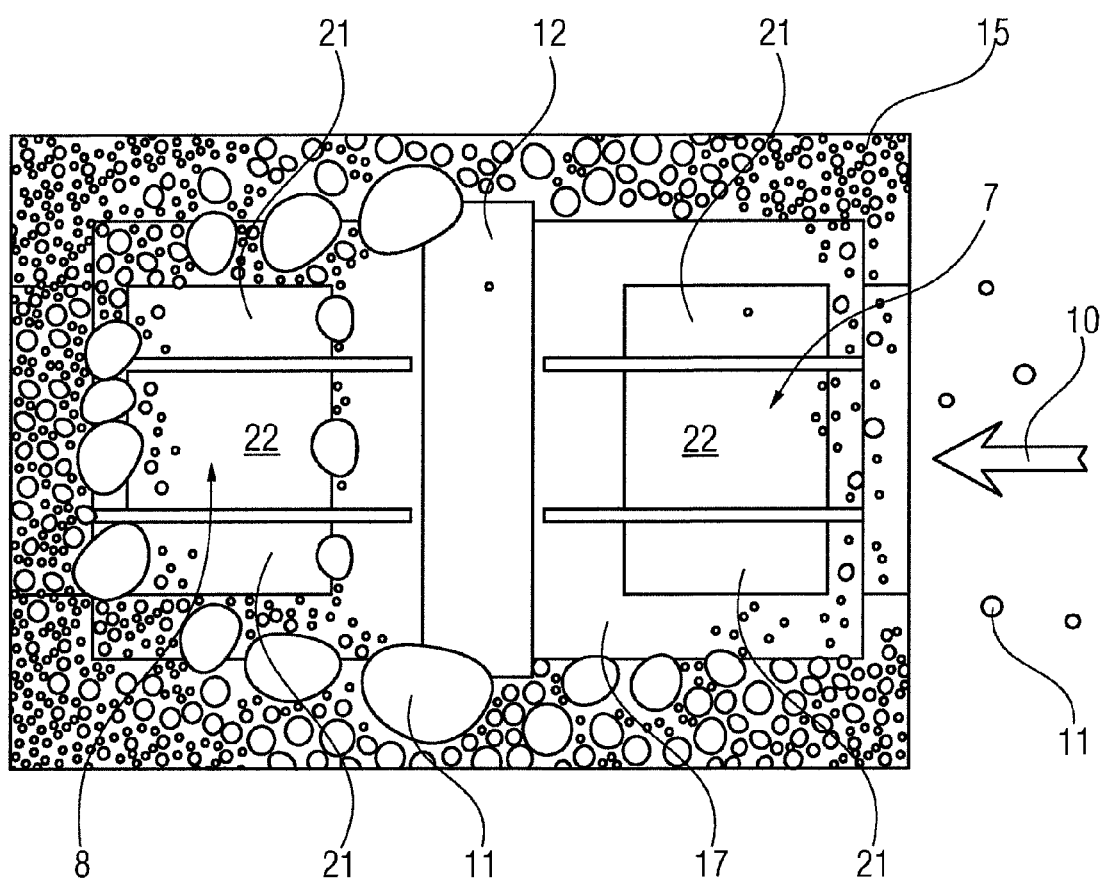
FIG. 6 shows the sensor element with the first temperature sensor element and the second temperature sensor element.

FIG. 6 shows the sensor element 15 with the first temperature sensor element 7 and the second temperature sensor element 8 as well as the heating element 12 arranged between the temperature sensor elements 7 and 8. The direction of the air mass flow 10 is illustrated with the arrow. Therefore, in the flow direction of the air mass flow 10 the first temperature sensor element 7 is arranged upstream of the heating element 12 and the second temperature sensor element 8 is arranged downstream of the heating element 12. Both the first temperature sensor element 7 and the second temperature sensor element 8 are composed as electrical series circuits comprising a measuring resistor 22, which for example has a large resistance value, and at least two comparison resistors 21, which for example have no resistance values. It is apparent that the measuring resistors 22 are arranged in the inner region of the thin diaphragm, and the comparison resistors 21 are arranged in the edge region of the diaphragm 17.

Furthermore, FIG. 6 shows that contamination 9, and in this context predominantly oil droplets 11, are transported with the mass flow 10 to the sensor element 15. In particular, the oil droplets 11 are deposited on the sensor element 15.

It is clearly apparent that the depositing of the oil droplets 11 on the sensor element 15 takes place to a particularly pronounced degree in the region of the resistors which are arranged downstream of the heating element 12 in the direction of flow of the air mass flow 10. This asymmetrical depositing of oil droplets 11 on the sensor element 15 gives rise to a signal drift, which ultimately brings about falsification of the measured values detected by the sensor element 15 for the air mass flow 10. Furthermore, the depositing of the contamination preferably occurs in the edge region of the diaphragm 17. The asymmetrical depositing of the oil droplets 11 has physical reasons, which are caused, in particular, by the relatively high temperature in the region of the second sensor element 8 and the temperature gradient in the edge region of the diaphragm 17.

Figure 7:
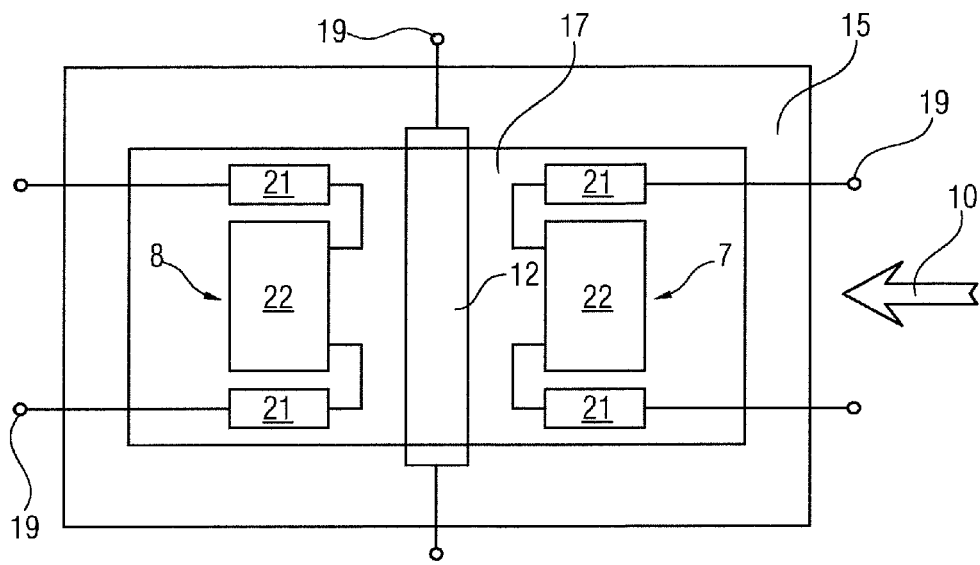
FIG. 7 shows a possible electrical connection of the resistors.

FIG. 7 shows a possible electrical connection of the comparison resistors 21 and of the measuring resistors 22 on the sensor element 15. Here, the first sensor element 7 is formed from a series circuit comprising a measuring resistor 22, which is arranged upstream of the heating element 12 in the direction of the air mass flow 10, and two comparison resistors 21, which are also arranged upstream of the heating element 12 in the direction of the air mass flow 10. The second temperature sensor element 8 is correspondingly formed from a series circuit comprising resistors, wherein the measuring resistor 22 is arranged downstream of the heating element 12, also with respect to the direction of flow of the air mass flow 10, and two comparison resistors 21 are arranged downstream of the heating element 12, likewise in the direction of the air mass flow 10.

All the resistors are arranged on the thin diaphragm 17, wherein the comparison resistors 21 can be found with the small resistance values in the edge region of the diaphragm 17, and the measuring resistors 22 with the large resistance values are arranged centrally on the thin diaphragm 17.

Figure 8:
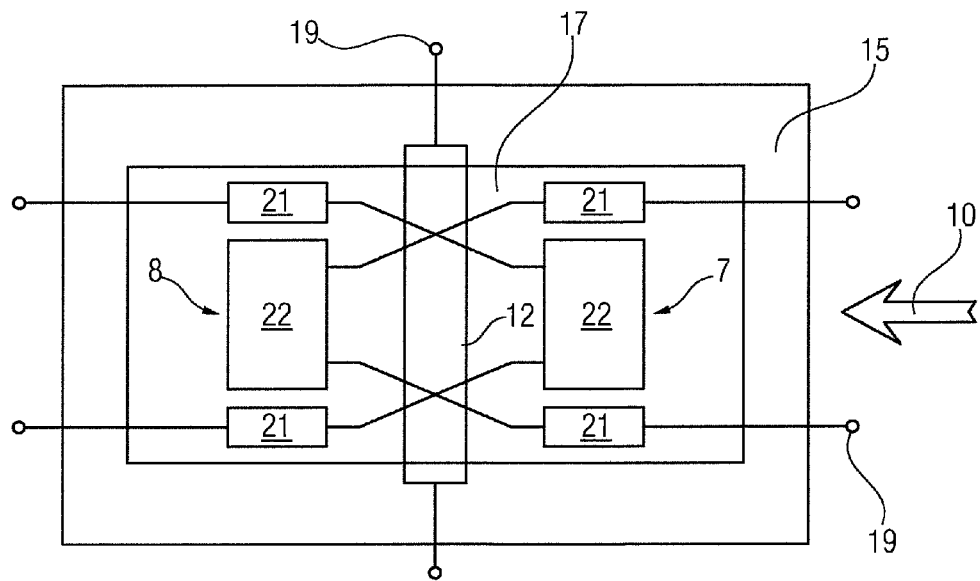
FIG. 8 shows the sensor element known from FIG. 7 with a further electrical connection of the resistors.

FIG. 8 shows the sensor element 15 from FIG. 7, in which a heating element 12 is arranged centrally on a thin diaphragm 17. This heating element 12 can be embodied, for example, as an electric resistance heater. The sensor element 15 is embodied as a microelectromechanical system, wherein the thin diaphragm 17 can be manufactured, for example, by correspondingly etching a silicon substrate. The comparison resistors 21, which can have, for example, small resistance values and the measuring resistors 22, which can have, for example, large resistance values, are processed onto this thin diaphragm 17. Therefore, in the exemplary embodiment according to FIG. 8 two measuring resistors 22 with a large resistance value and four comparison resistors 21 with small resistance values and an electrical resistor, which is used as a heating element 12, are located on the thin diaphragm.

The direction of flow of the air mass flow 10 is characterized by an arrow in FIG. 8. On the basis of this direction of flow, two comparison resistors 21 and one measuring resistor 22 are located upstream of the heating element 12, and a further two comparison resistors 21 and a further measuring resistor 22 are located downstream of the heating element.

The first temperature sensor element 7 is formed by electrically connecting a measuring resistor 22, located upstream of the heating element 12 on the thin diaphragm, and two comparison resistors 21, located downstream of the heating element 12, to form a series circuit. Therefore, a first series circuit comprising resistors forms a first temperature sensor element 7, which is formed from two comparison resistors 21, the first series circuit being located downstream of the heating element 12 in the direction of flow of the air mass flow 10, and are connected to a measuring resistor 22, which is positioned upstream of the heating element 12.

The second temperature sensor element 8 is constructed in a mirror-symmetrical fashion in relation to the axis of the heating element 12 as a series circuit of resistors. Here, a comparison resistor 21, positioned upstream of the heating element 12, is electrically connected to a measuring resistor 22, which is positioned downstream of the heating element 12 on the diaphragm 17. The measuring resistor 22 of the second temperature sensor element 8 is in turn electrically connected to a further comparison resistor 21, wherein the comparison resistor 21 is in turn positioned upstream of the electric heating element 12.

The terms "small resistance value" and "large resistance value" are to be understood as meaning that the resistance value of each individual measuring resistor 22 is at least ten times greater than the resistance value of an individual comparison resistor 21.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An air mass meter (2) comprising:
    a sensor element (15) configured such that an air mass flow (10) to be measured moves over the sensor element (15), the sensor element (15) comprising a microelectromechanical system, the sensor element (15) having:
    a diaphragm (17);
    a heating element (12) arranged on the diaphragm;
    a first resistor group comprising one electrical measuring resistor (22) and at least two electrical comparison resistors (21), the first resistor group being arranged on the diaphragm upstream of the heating element (12) in the direction of the air mass flow (10);
    a second resistor group comprising one electrical measuring resistor (22) and at least two electrical comparison resistors (21), the second resistor group being arranged on the diaphragm downstream of the heating element (12) in the direction of the air mass flow (10);
    a first temperature sensor element (7); and
    a second temperature sensor element (8),
    wherein the first and second temperature sensor elements are formed by electrical connection of, in each case, one measuring resistor (22) and at least two comparison resistors (21), the first temperature sensor element (7) comprising a series circuit having a measuring resistor (22) from the first resistor group, and two comparison resistors (21) from the second resistor group, and the second temperature sensor element (8) comprising a series circuit having a measuring resistor (22) from the second resistor group, and two comparison resistors (21) from the first resistor group.

2. The air mass meter (2) as claimed in claim 1, wherein the resistance values of the individual measuring resistors (22) are greater than the resistance values of the individual comparison resistors (21).

3. The air mass meter (2) as claimed in claim 2, wherein the resistance values of the individual measuring resistors (22) are greater than the resistance values of the individual comparison resistors (21) at least by a factor of 10.

4. The air mass meter (2) as claimed in claim 1, wherein the comparison resistors (21) are arranged in an edge region of the diaphragm (17).

5. The air mass meter (2) as claimed in claim 1, wherein the measuring resistors (22) are arranged in an inner region of the diaphragm (17).

* * * * *